(12) United States Patent
Xiang et al.

(10) Patent No.: US 12,289,053 B2
(45) Date of Patent: Apr. 29, 2025

(54) CONTROL METHOD AND CONTROL DEVICE FOR POWER SUPPLY DEVICE, COMPUTER-READABLE STORAGE MEDIUM AND PROCESSOR

(71) Applicant: Vertiv Corporation, Westerville, OH (US)

(72) Inventors: Bo Xiang, Guangdong (CN); Xiangfeng Zhang, Guangdong (CN); Qian Gao, Guangdong (CN); Jian Li, Guangdong (CN)

(73) Assignee: Vertiv Corporation, Westerville, OH (US)

( * ) Notice: Subject to any disclaimer, the term of this patent is extended or adjusted under 35 U.S.C. 154(b) by 100 days.

(21) Appl. No.: 18/155,686

(22) Filed: Jan. 17, 2023

(65) Prior Publication Data

US 2023/0336084 A1  Oct. 19, 2023

(30) Foreign Application Priority Data

Apr. 18, 2022 (CN) .................. 202210404084.X

(51) Int. Cl.
*H02M 1/42* (2007.01)
*H02M 1/00* (2006.01)
*H02M 3/335* (2006.01)

(52) U.S. Cl.
CPC ..... *H02M 3/33523* (2013.01); *H02M 1/0022* (2021.05); *H02M 1/4241* (2013.01)

(58) Field of Classification Search
CPC .......... H02J 9/062; H02J 9/068; H02M 1/42; H02M 1/4208; H02M 1/4225;

(Continued)

(56) References Cited

U.S. PATENT DOCUMENTS

2012/0069615 A1  3/2012  Tomioka
2014/0077602 A1  3/2014  Liu et al.
(Continued)

FOREIGN PATENT DOCUMENTS

CN  203522316 U  4/2014

OTHER PUBLICATIONS

Kulasekaran, Siddarth et al., "A 500-kHz, 3.3-kW Power Factor Correction Circuit With Low-Loss Auxiliary ZVT Circuit", IEEE Transactions On Power Electronics, Institute Of Electrical And Electronics Engineers, USA, vol. 33, No. 6, Jun. 1, 2018 (Jun. 1, 2018), pp. 4783-4795.

(Continued)

*Primary Examiner* — Jeffrey A Gblende
*Assistant Examiner* — Nusrat Quddus
(74) *Attorney, Agent, or Firm* — Harness, Dickey & Pierce, P.L.C.

(57) ABSTRACT

A power supply device and a control method for the same are disclosed. The method comprises: controlling, when there is the abnormal situation in the first input power supply, a first access point of a first relay and a third access point of the first relay to be disconnected, a second access point of the first relay and a fourth access point of the first relay to be disconnected, a common access point of a third relay and a second access point of the third relay to be connected, a common access point of a fourth relay and a second access point of the fourth relay to be connected, a first access point of a second relay and a third access point of the second relay to be connected, and a second access point of the second relay and a fourth access point of the second relay to be connected.

12 Claims, 6 Drawing Sheets

(58) Field of Classification Search
CPC ............. H02M 1/4233; H02M 1/4241; H02M 1/4258; H02M 1/4266; H02M 1/4283; H02M 7/12
See application file for complete search history.

(56) References Cited

U.S. PATENT DOCUMENTS

| | | |
|---|---|---|
| 2015/0123473 A1 | 5/2015 | Braylovskiy et al. |
| 2017/0279267 A1* | 9/2017 | Cheng .................... H02M 1/10 |
| 2022/0337153 A1* | 10/2022 | Lee ........................ H02M 1/10 |

OTHER PUBLICATIONS

Extended Search Report in corresponding European Patent Application No. 23152316.8 dated Sep. 18, 2023.

* cited by examiner

```
┌─────────────────────────────────────────────────┐
│ controlling, in case of powering by first input power supply, first access │
│  point of first relay and third access point of first relay to be connected, │
│   second access point of first relay and fourth access point of first relay │
│     to be connected, common access point of third relay and first access    │──S501
│   point of third relay to be connected, and common access point of fourth   │
│          relay and first access point of fourth relay to be connected       │
└─────────────────────────────────────────────────┘
                          │
                          ▼
┌─────────────────────────────────────────────────┐
│  detecting whether there is abnormal situation in first input power supply  │──S502
└─────────────────────────────────────────────────┘
                          │
                          ▼
┌─────────────────────────────────────────────────┐
│ controlling, when there is abnormal situation in first input power supply, │
│   first access point of first relay and third access point of first relay to be │
│    disconnected, second access point of first relay and fourth access point │
│  of first relay to be disconnected, common access point of third relay and  │
│   second access point of third relay to be connected, common access point   │──S503
│    of fourth relay and second access point of fourth relay to be connected, │
│    first access point of second relay and third access point of second relay │
│      to be connected, and second access point of second relay and fourth    │
│                 access point of second relay to be connected                │
└─────────────────────────────────────────────────┘
```

Figure 5

CONTROL METHOD AND CONTROL DEVICE FOR POWER SUPPLY DEVICE, COMPUTER-READABLE STORAGE MEDIUM AND PROCESSOR

The present disclosure claims the priority to Chinese Patent Application No. 202210404084.X, entitled "POWER SUPPLY DEVICE AND CONTROL METHOD FOR POWER SUPPLY DEVICE", filed on Apr. 18, 2022 with the China National Intellectual Property Administration, which is incorporated herein by reference in its entirety.

FIELD

The present disclosure relates to the field of power supplies for powering, and in particular to a power supply device and a control method for the power supply device.

BACKGROUND

To improve the reliability of powering, the existing powering schemes generally adopt a dual redundant power supply mode. The dual redundant power supply mode refers to the adoption of two input power supplies where each input power supply is equipped with one set of power supply device, and then outputs of the two sets of power supply devices are combined into one output to power a subsequent load. When an abnormality occurs in one of the input power supplies, the other of the input power supplies continues to power the subsequent load. In such a power supply mode, two sets of power supply devices need to be provided, resulting in a higher cost of the entire power supply device.

With regard to the problem in the related technology that the adoption of the dual redundant power supply mode in which two sets of power supply devices need to be provided results in a higher cost, no effective solution has yet been proposed at present.

SUMMARY

A main object of the present disclosure is to provide a power supply device and a control method for the power supply device, so as to solve the problem in the related technology that the adoption of the dual redundant power supply mode results in a higher cost.

To achieve the above-mentioned object, according to an aspect of the present disclosure, there is provided a power supply device. The device comprises: an automatic transfer switch comprising an input terminal connected to an output terminal of a first input power supply and an output terminal of a second input power supply, and configured to connect the first input power supply or the second input power supply to a power factor correction circuit; the power factor correction circuit comprising an input terminal connected to an output terminal of the automatic transfer switch, and configured to adjust an input power factor of a load, wherein the load is powered by the first input power supply or the second input power supply; and a DC-DC converter comprising an input terminal connected to an output terminal of the power factor correction circuit and an output terminal connected to the load, and configured to convert an output voltage of the power factor correction circuit to an input voltage of the load.

Further, the power factor correction circuit is at least one of: a totem-pole power factor correction circuit, a bridge power factor correction circuit, and a bridgeless power factor correction circuit.

Further, the DC-DC converter is at least one of: an LLC resonant full-bridge circuit, an LLC resonant half-bridge circuit, and a phase-shifted full-bridge topology circuit.

Further, the automatic transfer switch comprises: a first relay, a second relay, a third relay, and a fourth relay, wherein the first relay and the second relay are double-pole double-throw switches, and the third relay and the fourth relay are single-pole double-throw switches; wherein a first access point of the first relay is connected to a positive output terminal of the first input power supply, a second access point of the first relay is connected to a negative output terminal of the first input power supply, a third access point of the first relay is connected to a first access point of the third relay, a fourth access point of the first relay is connected to a first access point of the fourth relay, a common access point of the third relay is connected to a positive input terminal of the power factor correction circuit, and a common access point of the fourth relay is connected to a negative input terminal of the power factor correction circuit; and wherein a first access point of the second relay is connected to a positive output terminal of the second input power supply, a second access point of the second relay is connected to a negative output terminal of the second input power supply, a third access point of the second relay is connected to a second access point of the third relay, and a fourth access point of the second relay is connected to a second access point of the fourth relay.

To achieve the above-mentioned object, according to an aspect of the present disclosure, there is provided a control method for a power supply device. The method comprises: controlling, in a case of powering by the first input power supply, the first access point of the first relay and the third access point of the first relay to be connected, the second access point of the first relay and the fourth access point of the first relay to be connected, the common access point of the third relay and the first access point of the third relay to be connected, and the common access point of the fourth relay and the first access point of the fourth relay to be connected; detecting whether there is an abnormal situation in the first input power supply, wherein the abnormal situation comprises at least one of: overvoltage, brown-out, and drop-out; and controlling, when there is the abnormal situation in the first input power supply, the first access point of the first relay and the third access point of the first relay to be disconnected, the second access point of the first relay and the fourth access point of the first relay to be disconnected, the common access point of the third relay and the second access point of the third relay to be connected, the common access point of the fourth relay and the second access point of the fourth relay to be connected, the first access point of the second relay and the third access point of the second relay to be connected, and the second access point of the second relay and the fourth access point of the second relay to be connected.

Further, the method further comprises: before controlling the first access point of the first relay and the third access point of the first relay to be disconnected, and the second access point of the first relay and the fourth access point of the first relay to be disconnected, turning off a drive signal for driving the power factor correction circuit to operate; and after controlling the first access point of the second relay and the third access point of the second relay to be connected, and the second access point of the second relay and the fourth access point of the second relay to be connected, detecting whether an input voltage value of the power factor correction circuit matches a voltage value of the second input power supply, and in a case where the input voltage value of the power factor correction circuit matches the voltage value of the second input power supply, restoring the drive signal for driving the power factor correction circuit to operate.

Further, the method further comprises: after controlling the first access point of the second relay and the third access point of the second relay to be connected, and the second access point of the second relay and the fourth access point of the second relay to be connected, detecting whether the first input power supply is restored to a normal situation; and controlling, when the first input power is restored to the normal situation, the first access point of the second relay and the third access point of the second relay to be disconnected, the second access point of the second relay and the fourth access point of the second relay to be disconnected, the common access point of the third relay and the first access point of the third relay to be connected, the common access point of the fourth relay and the first access point of the fourth relay to be connected, the first access point of the first relay and the third access point of the first relay to be connected, and the second access point of the first relay and the fourth access point of the first relay to be connected.

Further, the method further comprises: before controlling the first access point of the second relay and the third access point of the second relay to be disconnected, and the second access point of the second relay and the fourth access point of the second relay to be disconnected, turning off the drive signal for driving the power factor correction circuit to operate; and after controlling the first access point of the first relay and the third access point of the first relay to be connected, and the second access point of the first relay and the fourth access point of the first relay to be connected, detecting whether the input voltage value of the power factor correction circuit matches a voltage value of the first input power supply, and in a case where the input voltage value of the power factor correction circuit matches the voltage value of the first input power supply, restoring the drive signal for driving the power factor correction circuit to operate.

To achieve the above-mentioned object, according to another aspect of the present disclosure, there is provided a control device for a power supply device. The device comprises: a first control unit configured to control, in a case of powering by the first input power supply, the first access point of the first relay and the third access point of the first relay to be connected, the second access point of the first relay and the fourth access point of the first relay to be connected, the common access point of the third relay and the first access point of the third relay to be connected, and the common access point of the fourth relay and the first access point of the fourth relay to be connected; a first detection unit configured to detect whether there is an abnormal situation in the first input power supply, wherein the abnormal situation comprises at least one of: overvoltage, brown-out, and drop-out; and a second control unit configured to control, when there is the abnormal situation in the first input power supply, the first access point of the first relay and the third access point of the first relay to be disconnected, the second access point of the first relay and the fourth access point of the first relay to be disconnected, the common access point of the third relay and the second access point of the third relay to be connected, the common access point of the fourth relay and the second access point of the fourth relay to be connected, the first access point of the second relay and the third access point of the second relay to be connected, and the second access point of the second relay and the fourth access point of the second relay to be connected.

Further, the control device further comprises: a third control unit configured to, before controlling the first access point of the first relay and the third access point of the first relay to be disconnected, and the second access point of the first relay and the fourth access point of the first relay to be disconnected, turn off a drive signal for driving the power factor correction circuit to operate; and a second detection unit configured to, after controlling the first access point of the second relay and the third access point of the second relay to be connected, and the second access point of the second relay and the fourth access point of the second relay to be connected, detect whether an input voltage value of the power factor correction circuit matches a voltage value of the second input power supply, and in a case where the input voltage value of the power factor correction circuit matches the voltage value of the second input power supply, restore the drive signal for driving the power factor correction circuit to operate.

Further, the control device further comprises: a third detection unit configured to, after controlling the first access point of the second relay and the third access point of the second relay to be connected, and the second access point of the second relay and the fourth access point of the second relay to be connected, detect whether the first input power supply is restored to a normal situation; and a fourth control unit configured to control, when the first input power is restored to the normal situation, the first access point of the second relay and the third access point of the second relay to be disconnected, the second access point of the second relay and the fourth access point of the second relay to be disconnected, the common access point of the third relay and the first access point of the third relay to be connected, the common access point of the fourth relay and the first access point of the fourth relay to be connected, the first access point of the first relay and the third access point of the first relay to be connected, and the second access point of the first relay and the fourth access point of the first relay to be connected.

Further, the control device further comprises: a fifth control unit configured to, before controlling the first access point of the second relay and the third access point of the second relay to be disconnected, and the second access point of the second relay and the fourth access point of the second relay to be disconnected, turn off the drive signal for driving the power factor correction circuit to operate; and a fourth detection unit configured to, after controlling the first access point of the first relay and the third access point of the first relay to be connected, and the second access point of the first relay and the fourth access point of the first relay to be connected, detect whether the input voltage value of the power factor correction circuit matches a voltage value of the first input power supply, and in a case where the input voltage value of the power factor correction circuit matches the voltage value of the first input power supply, restore the drive signal for driving the power factor correction circuit to operate.

To achieve the above-mentioned object, according to another aspect of the present disclosure, there is provided a computer-readable storage medium storing a program, wherein the program performs any one of the control methods for the power supply device described above.

To achieve the above-mentioned object, according to another aspect of the present disclosure, there is provided a processor configured to execute a program, wherein the program, when executed, performs any one of the control methods for the power supply device described above.

Through the present disclosure, the problem in the related technology that the adoption of a dual redundant power supply mode in which two sets of power supply devices need to be provided results in a higher cost is solved by adopting the steps of: controlling, in a case of powering by the first input power supply, the first access point of the first relay and the third access point of the first relay to be connected, the second access point of the first relay and the fourth access point of the first relay to be connected, the common access point of the third relay and the first access point of the third relay to be connected, and the common access point of the fourth relay and the first access point of the fourth relay to be connected; detecting whether there is an abnormal situation in the first input power supply, wherein the abnormal situation comprises at least one of: overvoltage, brown-out, and drop-out; and controlling, when there is the abnormal situation in the first input power supply, the first access point of the first relay and the third access point of the first relay to be disconnected, the second access point of the first relay and the fourth access point of the first relay to be disconnected, the common access point of the third relay and the second access point of the third relay to be connected, the common access point of the fourth relay and the second access point of the fourth relay to be connected, the first access point of the second relay and the third access point of the second relay to be connected, and the second access point of the second relay and the fourth access point of the second relay to be connected. By controlling the connection and disconnection of the relays in the automatic transfer switch, the switching between the two input power supplies is realized, which avoids the adoption of the dual redundant power supply mode, thereby achieving an effect of reducing a cost.

BRIEF DESCRIPTION OF THE DRAWINGS

The accompanying drawings that form a part of the present disclosure are used to provide further understanding to the present disclosure. Schematic embodiments of the present disclosure and descriptions thereof are used to explain the present disclosure, and do not constitute improper limitations to the present disclosure. In the drawings:

FIG. 5 is a flowchart of a control method for a power supply device according to an embodiment of the present disclosure;

Figure 1:
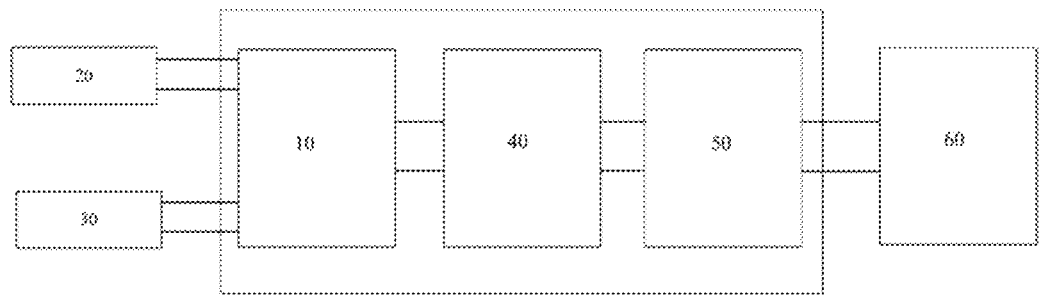
FIG. 1 is a schematic diagram of a power supply device according to an embodiment of the present disclosure.

In the drawings: 10—automatic transfer switch, 20—first input power supply, 30—second input power supply, 40—power factor correction circuit, 50—DC-DC converter, 60—load;

D1—first diode, D2—second diode, D3—third diode, D4—Fourth diode, C—first capacitor, $C_O$—second capacitor, S1—first relay, S2—second relay, S3—third relay, S4—fourth relay, S5—first field effect transistor, S6—second field effect transistor, S9—third field effect transistor, S10—fourth field effect transistor, S11—fifth field effect transistor, S12—sixth field effect transistor, L—inductor, T—transformer, $R_L$—resistor.

DETAILED DESCRIPTION OF THE EMBODIMENTS

It should be noted that, without confliction, embodiments in the present disclosure and features in the embodiments may be combined with each other. The present disclosure will be described in detail below with reference to the accompanying drawings combined with the embodiments.

To enable those skilled in the art to better understand the solutions of the present disclosure, the technical solutions in the embodiments in the present disclosure will be described clearly and completely below in conjunction with the drawings in the embodiments of the present disclosure. Obviously, the embodiments as described are only some of the embodiments of the present disclosure, but not all of the embodiments. Based on the embodiments in the present disclosure, all other embodiments obtained by those ordinarily skilled in the art without creative work shall fall within the scope of protection of the present disclosure.

It should be noted that, terms such as "first", "second" and the like in the description and the claims of the present disclosure as well as the above-mentioned drawings are used to distinguish similar objects, but are not necessarily used to describe a specific order or chronological sequence. It should be understood that data used as such are interchangeable under appropriate circumstances, for the convenience of the embodiments of the present disclosure described herein. Also, terms "comprise" and "have" and any variations thereof are intended to encompass non-exclusive inclusion, for example, a process, method, system, product or apparatus comprising a series of steps or units is not necessarily limited to those steps or units clearly listed, but may include other steps or units not clearly listed or inherent to the process, method, product or apparatus.

The present disclosure will be described below in conjunction with preferred embodiments. FIG. 1 is a schematic diagram of a power supply device according to an embodiment of the present disclosure. As shown in FIG. 1, the device comprises:

an automatic transfer switch 10 comprising an input terminal connected to an output terminal of a first input power supply 20 and an output terminal of a second input power supply 30, and configured to connect the first input power supply 20 or the second input power supply 30 to a power factor correction circuit (PFC) 40; the power factor correction circuit 40 comprising an input terminal connected to an output terminal of the automatic transfer switch 10, and configured to adjust an input power factor of a load 60, wherein the load 60 is powered by the first input power supply 20 or the second input power supply 30; and a DC-DC converter (DCDC) 50 comprising an input terminal connected to an output terminal of the power factor correction circuit 40 and an output terminal connected to the load 60, and configured to convert an output voltage of the power factor correction circuit 40 to an input voltage of the load 60.

The power supply device as shown in FIG. 1 is equipped with dual input power supplies (the first input power supply 20 and the second input power supply 30), which are connected through the automatic transfer switch 10 (ATS) to the power factor correction circuit 40 and then to the DC-DC converter 50, and finally to the load 60 for powering.

Input terminals of the first input power supply 20 and the second input power supply 30 are connected to the input terminal of the automatic transfer switch 10, to realize the utilization of the first input power supply 20 or the second input power supply 30 to power the load 60 through the automatic transfer switch 10. The automatic transfer switch 10 can automatically switch an input power supply to the second input power supply 30 when the first input power supply 20 is abnormal. The output terminal of the automatic transfer switch 10 is connected to the input terminal of the power factor correction circuit 40. The power factor correction circuit 40 can raise a power factor of the system or device and solve the problems of electromagnetic interference and electromagnetic compatibility. The output terminal of the power factor correction circuit 40 is connected to the input terminal of the DC-DC converter 50. The DC-DC converter 50 efficiently realizes voltage conversion and converts an output voltage of the power factor correction circuit 40 to an input voltage requested by the load 60.

The highly integrated power supply device with dual input power supplies automatically switches to the second input power supply 30 to power the load 60, through the automatic transfer switch 10, when the first input power supply 20 is abnormal, thereby ensuring that an output voltage of the power supply device is normal, which avoids the problem of data losing and damage that may occur in an electronic system due to the interruption of the input power supply, and reduces the number of power supply devices, so as to reduce an overall cost of the power supply device.

In an embodiment, in the power supply device according to the embodiment of the present disclosure, the automatic transfer switch 10 comprises: a first relay S1, a second relay S2, a third relay S3, and a fourth relay S4, wherein the first relay S1 and the second relay S2 are double-pole double-throw switches, and the third relay S3 and the fourth relay S4 are single-pole double-throw switches; wherein a first access point of the first relay S1 is connected to a positive output terminal of the first input power supply 20, a second access point of the first relay S1 is connected to a negative output terminal of the first input power supply 20, a third access point of the first relay S1 is connected to a first access point of the third relay S3, a fourth access point of the first relay S1 is connected to a first access point of the fourth relay S4, a common access point of the third relay S3 is connected to a positive input terminal of the power factor correction circuit 40, and a common access point of the fourth relay S4 is connected to a negative input terminal of the power factor correction circuit 40; and wherein a first access point of the second relay S2 is connected to a positive output terminal of the second input power supply 30, a second access point of the second relay S2 is connected to a negative output terminal of the second input power supply 30, a third access point of the second relay S2 is connected to a second access point of the third relay S3, and a fourth access point of the second relay S2 is connected to a second access point of the fourth relay S4.

Figure 2:
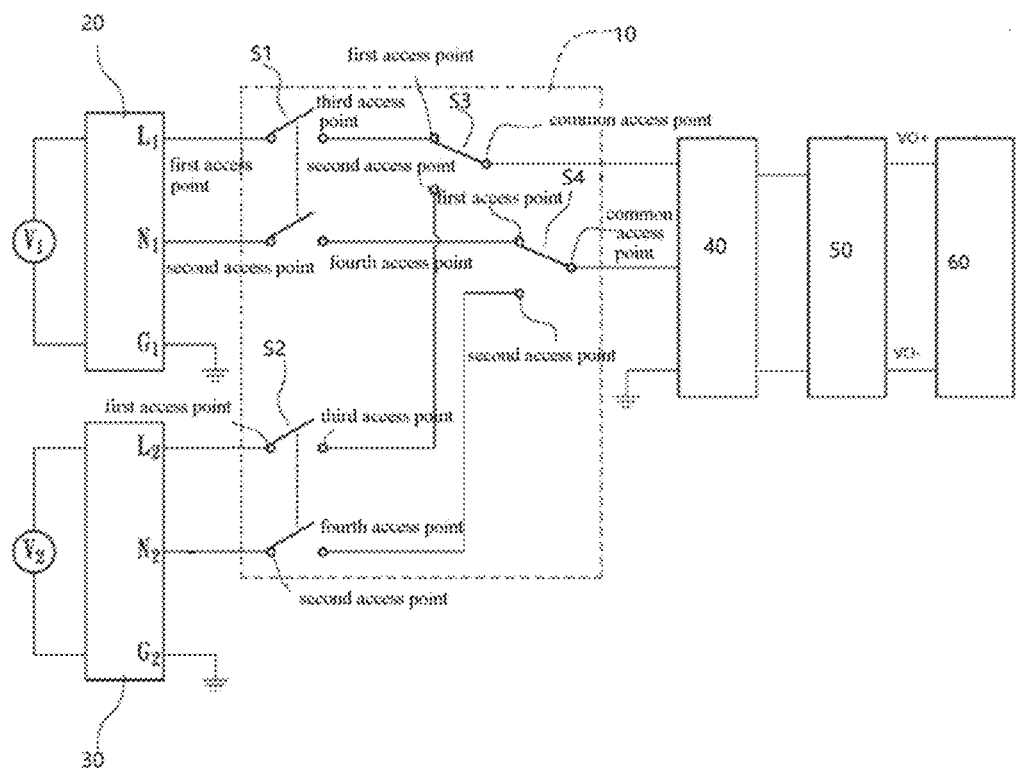
FIG. 2 is a schematic diagram of an optional automatic transfer switch according to an embodiment of the present disclosure.

For example, as shown in FIG. 2, the automatic transfer switch 10 comprises a first relay S1, a second relay S2, a third relay S3, and a fourth relay S4. The first relay S1 and the second relay S2 are double-pole double-throw switches, and the third relay S3 and the fourth relay S4 are single-pole double-throw switches. It should be noted that, the single-pole double-throw switch is composed of a movable end and an immovable end, the movable end and the immovable end are respectively provided with contacts, and the contact on the side of the immovable end is a common access point. In an embodiment, the first relay S1 and the second relay S2 may be replaced with single-pole single-throw switches, and the third relay S3 and the fourth relay S4 may also be replaced with single-pole single-throw switches. The first output power supply is connected to the circuit through the first relay S1, the third relay S3 and the fourth relay S4. The second output power supply is connected to the circuit through the second relay S2, the third relay S3 and the fourth relay S4. The states of the relays of the automatic transfer switch 10 are not limited in a process of use. It should be noted that, both the first relay S1 and the second relay S2 may be in a normally-off mode, that is, when there is no power supply, the relays are in an off mode; and both the first relay S1 and the second relay S2 may also be in a normally-on mode.

In an embodiment, in the power supply device according to the embodiment of the present disclosure, the power factor correction circuit 40 is at least one of: a totem-pole power factor correction circuit, a bridge power factor correction circuit, and a bridgeless power factor correction circuit.

The type of the power factor circuit 40 is not limited in the power supply device according to the embodiment of the present disclosure. The power factor circuit 40, due to its performance in terms of efficiency and power density, can further reduce the use of devices and reduce the number of power devices and a loss on a conduction path if it tends to be a bridgeless type. A totem-pole power factor correction circuit is a bridgeless topology, and its control method also tends to be mature. The power factor circuit 40 in the power supply device may be a totem-pole power factor correction circuit, a bridge power factor correction circuit, and a bridgeless power factor correction circuit.

Figure 3:
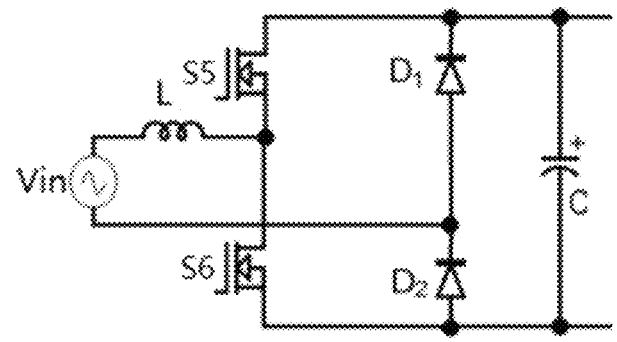
FIG. 3 is a schematic diagram of an optional totem-pole power factor correction circuit according to an embodiment of the present disclosure.

A totem-pole power factor correction circuit is used in the embodiment of the present disclosure, as shown in FIG. 3. The totem-pole power factor correction circuit comprises: an inductor L comprising a first terminal connected to a positive output terminal of the automatic transfer switch 10, and a second terminal respectively connected to a source of a first field effect transistor S5 and a drain of a second field effect transistor S6; the first field effect transistor S5 comprising a gate connected to a controller, and a drain connected to a negative pole of a first diode D1; the second field effect transistor S6 comprising a gate connected to the controller, and a source connected to a positive pole of a second diode D2; the first diode D1 comprising a positive pole connected to a negative pole of the second diode D2; the second diode D2 comprising a negative pole connected to a negative output terminal of the automatic transfer switch 10; and a first capacitor C comprising a positive pole connected to the negative pole of the first diode D1, and a negative pole connected to the positive pole of the second diode D2.

Through the totem-pole power factor correction circuit, the operating efficiency of the power supply device can be effectively improved.

In an embodiment, in the power supply device according to the embodiment of the present disclosure, the DC-DC converter 50 is at least one of: an LLC resonant full-bridge circuit, an LLC resonant half-bridge circuit, and a phase-shifted full-bridge topology circuit.

Figure 4:
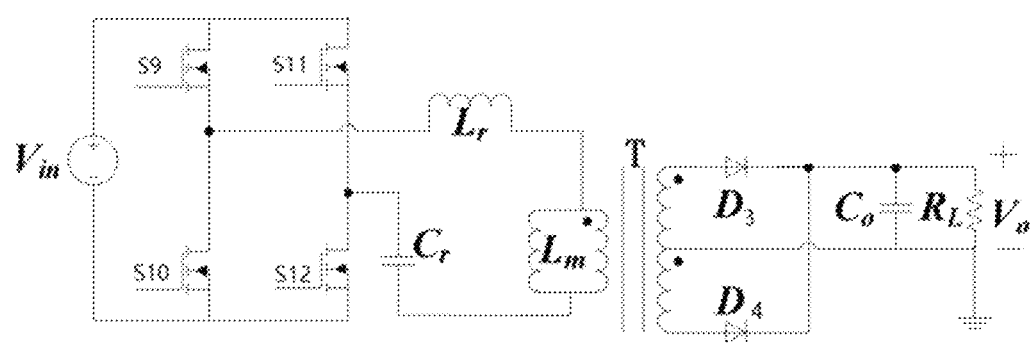
FIG. 4 is a schematic diagram of an optional LLC resonant full-bridge circuit according to an embodiment of the present disclosure.

The type of the DC-DC converter 50 is not limited in the power supply device according to the embodiment of the present disclosure. An LLC resonant full-bridge circuit is used in the embodiment of the present disclosure, as shown in FIG. 4. The LLC resonant full-bridge circuit comprises: a full-bridge circuit comprising a positive input terminal connected to a positive output terminal of the power factor correction circuit 40, a negative input terminal connected to a negative output terminal of the power factor correction circuit 40, a positive output terminal connected to a first input terminal of a transformer T, and a negative output terminal connected to a second input terminal of the transformer T, wherein the full-bridge circuit comprises a third field effect transistor S9, a fourth field effect transistor S10, a fifth field effect transistor S11, and a sixth field effect transistor S12; the transformer T comprising a first output terminal connected to a positive pole of a third diode D3, a second output terminal connected to a first terminal of a second capacitor, and a third output terminal connected to a positive pole of a fourth diode D4; the third diode D3 comprising a negative pole connected to a second terminal of the second capacitor; the fourth diode D4 comprising a negative pole connected to the second terminal of the second capacitor $C_0$; and a resistor $R_L$ connected in parallel to the second capacitor $C_0$. The inductor Lr, the inductor Lm and the capacitor Cr are built-in devices of the transformer T in FIG. 4.

The LLC resonant full-bridge circuit has the advantages of high operating frequency, small loss, high efficiency, small volume, etc.

Through the power supply device, the switching between the input power supplies can be automatically realized, which reduces the complexity of the circuit, so as to reduce a cost of the power supply device.

FIG. 5 is a flowchart of a control method for a power supply device according to an embodiment of the present disclosure. As shown in FIG. 5, the method comprises Step S501, Step S502 and Step S503.

Step S501 includes controlling, in a case of powering by the first input power supply 20, the first access point of the first relay S1 and the third access point of the first relay S1 to be connected, the second access point of the first relay S1 and the fourth access point of the first relay S1 to be connected, the common access point of the third relay S3 and the first access point of the third relay S3 to be connected, and the common access point of the fourth relay S4 and the first access point of the fourth relay S4 to be connected.

For example, at the time of normally powering by the first input power supply 20, the first access point of the first relay S1 and the third access point of the first relay S1 are connected, the second access point of the first relay S1 and the fourth access point of the first relay S1 are connected, the common access point of the third relay S3 and the first access point of the third relay S3 are connected, the common access point of the fourth relay S4 and the first access point of fourth relay S4 are connected, so that the first input power supply 20 is connected to the circuit. The first input power supply 20 powers the load 60 through the first relay S1, the third relay S3 and the fourth relay S4.

Step S502 includes detecting whether there is an abnormal situation in the first input power supply 20, wherein the abnormal situation comprises at least one of: overvoltage, brown-out, and drop-out.

For example, during the first relay S1, the third relay S3 and the fourth relay S4 are on, it is detected whether there is an abnormal situation in the first input power supply 20, the abnormal situation comprising overvoltage, brown-out, and drop-out.

Step S503 includes controlling, when there is the abnormal situation in the first input power supply 20, the first access point of the first relay S1 and the third access point of the first relay S1 to be disconnected, the second access point of the first relay S1 and the fourth access point of the first relay S1 to be disconnected, the common access point of the third relay S3 and the second access point of the third relay S3 to be connected, the common access point of the fourth relay S4 and the second access point of the fourth relay S4 to be connected, the first access point of the second relay S2 and the third access point of the second relay S2 to be connected, and the second access point of the second relay S2 and the fourth access point of the second relay S2 to be connected.

For example, when it is detected that there is the abnormal situation in the first input power supply 20, the first access point of the first relay S1 and the third access point of the first relay S1 are disconnected, the second access point of the first relay S1 and the fourth access point of the first relay S1 are disconnected, the common access point of the third relay S3 and the second access point of the third relay S3 are connected, the common access point of the fourth relay S4 and the second access point of the fourth relay S4 are connected, the first access point of the second relay S2 and the third access point of the second relay S2 are connected, and the second access point of the second relay S2 and the fourth access point of the second relay S2 are connected, so that the input power supply is switched from the first input power supply 20 to the second input power supply 30. The second input power supply 30 powers the load 60 through the second relay S2, the third relay S3 and the fourth relay S4.

To sum up, by turning on or off the relays in the automatic transfer switch 10, the switching between the input power supplies is automatically realized, which avoids the adoption of a dual redundant power supply mode, and reduces a cost of the power supply device.

In an embodiment, in the control method for the power supply device according to the embodiment of the present disclosure, before controlling the first access point of the first relay S1 and the third access point of the first relay S1 to be disconnected, and the second access point of the first relay S1 and the fourth access point of the first relay S1 to be disconnected, the method further comprises: turning off a drive signal for driving the power factor correction circuit 40 to operate; and after controlling the first access point of the second relay S2 and the third access point of the second relay S2 to be connected, and the second access point of the second relay S2 and the fourth access point of the second relay S2 to be connected, the method further comprises: detecting whether an input voltage value of the power factor correction circuit 40 matches a voltage value of the second input power supply, and in a case where the input voltage value of the power factor correction circuit 40 matches the voltage value of the second input power supply, restoring the drive signal for driving the power factor correction circuit to operate.

Specifically, when it is detected that there is the abnormal situation in the first input power supply 20, it is required to first turn off a drive signal for driving the power factor correction circuit 40 to operate, and then to turn off the first relay S1. After the second relay S2 is turned on, it is detected whether an input voltage value of the power factor correction circuit 40 matches a voltage value of the second input power supply. The matching herein refers to that two voltage values are equal or approximately equal. When the input voltage value of the power factor correction circuit 40 matches the voltage value of the second input power supply, the drive signal for driving the power factor correction circuit to operate is restored. Such operations aim to ensure that the second relay S2 has been completely turned on, that is, the second input power supply 30 has been successfully connected to the circuit, so as to avoid the power factor correction circuit 40 from doing useless work.

In an embodiment, in the control method for the power supply device according to the embodiment of the present disclosure, after controlling the first access point of the second relay S2 and the third access point of the second relay S2 to be connected, and the second access point of the second relay S2 and the fourth access point of the second relay S2 to be connected, the method further comprises: detecting whether the first input power supply 20 is restored to a normal situation; and controlling, when the first input power 20 is restored to the normal situation, the first access point of the second relay S2 and the third access point of the second relay S2 to be disconnected, the second access point of the second relay S2 and the fourth access point of the second relay S2 to be disconnected, the common access point of the third relay S3 and the first access point of the third relay S3 to be connected, the common access point of the fourth relay S4 and the first access point of the fourth relay S4 to be connected, the first access point of the first relay S1 and the third access point of the first relay S1 to be connected, and the second access point of the first relay S1 and the fourth access point of the first relay S1 to be connected.

For example, during powering by the second input power supply 30, it is detected whether the first input power supply 20 is restored to a normal situation. When the first input power 20 is restored to the normal situation, the automatic transfer switch starts to initiate an operation of switching the input power supply back to the first input power supply 20. The first access point of the second relay S2 and the third access point of the second relay S2 are disconnected, the second access point of the second relay S2 and the fourth access point of the second relay S2 are disconnected, the common access point of the third relay S3 and the first access point of the third relay S3 are connected, the common access point of the fourth relay S4 and the first access point of the fourth relay S4 are connected, the first access point of the first relay S1 and the third access point of the first relay S1 are connected, and the second access point of the first relay S1 and the fourth access point of the first relay S1 are connected, so as to realize powering by the first input power supply 20.

When the first input power supply 20 is in the normal situation, the switching of the input power supply from the second input power supply 30 back to the first input power supply 20 can be automatically realized, which ensures that the load 60 is powered by the first input power supply 20, so as to improve the reliability of the power supply device.

In an embodiment, in the control method for the power supply device according to the embodiment of the present disclosure, before controlling the first access point of the second relay S2 and the third access point of the second relay S2 to be disconnected, and the second access point of the second relay S2 and the fourth access point of the second relay S2 to be disconnected, the method further comprises: turning off a drive signal for driving the power factor correction circuit 40 to operate; and after controlling the first access point of the first relay S1 and the third access point of the first relay S1 to be connected, and the second access point of the first relay S1 and the fourth access point of the first relay S1 to be connected, the method further comprises: detecting whether an input voltage value of the power factor correction circuit 40 matches a voltage value of the first input power supply, and in a case where the input voltage value of the power factor correction circuit 40 matches the voltage value of the first input power supply, restoring the drive signal for driving the power factor correction circuit 40 to operate.

Specifically, when it is detected that the first input power supply 20 is restored to the normal situation, a drive signal for driving the power factor correction circuit 40 to operate is turned off first, and then after the second relay S2 is turned off and the first relay S1 is turned on, it is detected whether an input voltage value of the power factor correction circuit 40 matches a voltage value of the first input power supply. In a case where the input voltage value of the power factor correction circuit 40 matches the voltage value of the first input power supply, the drive signal for driving the power factor correction circuit 40 to operate is restored. Such operations aim to ensure that the first relay S1 has been completely turned on, that is, the first input power supply 20 has been successfully connected to the circuit, so as to avoid that: when the relays are still being in a switching process, the power factor correction circuit starts to emit waves, which results in on-load switching of the relays and easily causes damages to the relays.

Through the control method for the power supply device according to the embodiment of the present disclosure, the problem in the related technology that the adoption of a dual redundant power supply mode in which two sets of power supply devices need to be provided results in a higher cost is solved by: controlling, in a case of powering by the first input power supply 20, the first access point of the first relay S1 and the third access point of the first relay S1 to be connected, the second access point of the first relay S1 and the fourth access point of the first relay S1 to be connected, the common access point of the third relay S3 and the first access point of the third relay S3 to be connected, and the common access point of the fourth relay S4 and the first access point of the fourth relay S4 to be connected; detecting whether there is an abnormal situation in the first input power supply 20, wherein the abnormal situation comprises at least one of: overvoltage, brown-out, and drop-out; and controlling, when there is the abnormal situation in the first input power supply 20, the first access point of the first relay S1 and the third access point of the first relay S1 to be disconnected, the second access point of the first relay S1 and the fourth access point of the first relay S1 to be disconnected, the common access point of the third relay S3 and the second access point of the third relay S3 to be connected, the common access point of the fourth relay S4 and the second access point of the fourth relay S4 to be connected, the first access point of the second relay S2 and the third access point of the second relay S2 to be connected, and the second access point of the second relay S2 and the fourth access point of the second relay S2 to be connected. By turning on or off the relays in the automatic transfer switch 10, the switching between the two input power supplies is realized, which avoids the adoption of a dual redundant power supply mode, thereby achieving an effect of reducing a cost.

Figure 6:
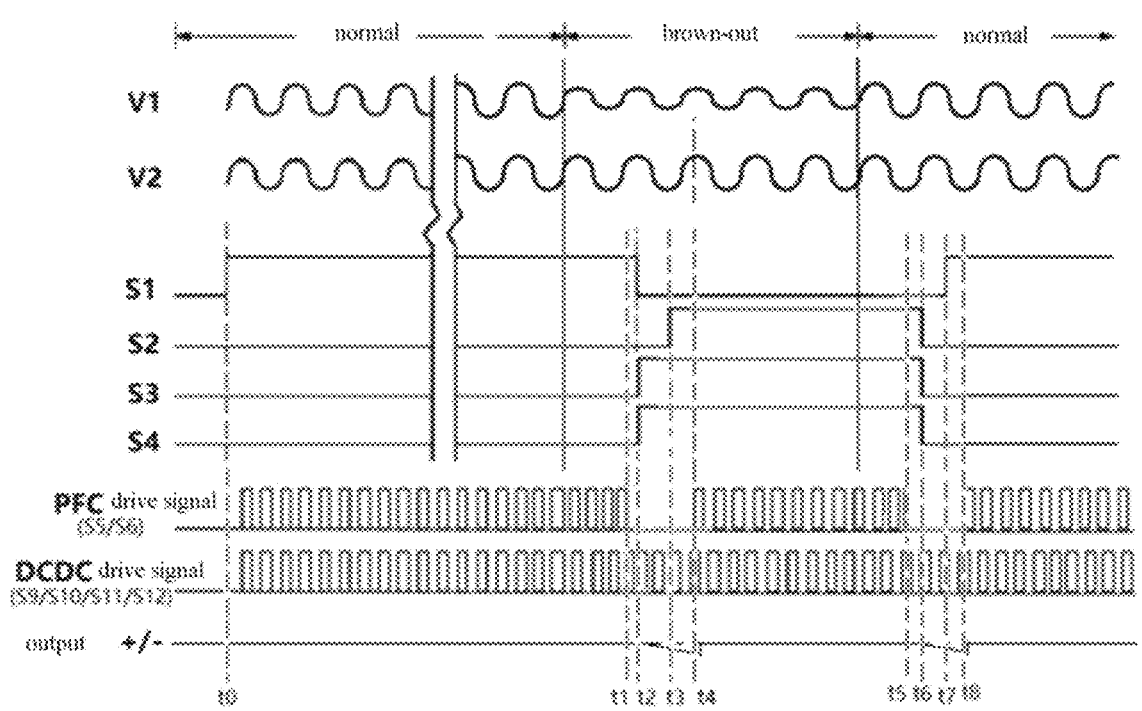
FIG. 6 is a control timing diagram at the time of occurrence of brown-out to an optional first input power supply according to an embodiment of the present disclosure.

FIG. 6 is a control timing diagram at the time of occurrence of brown-out to an optional first input power supply 20 according to an embodiment of the present disclosure. The brown-out represents that an input voltage is lower than a preset value. Taking an alternating current as an example, 176V~300V AC are usually considered as normal values, and if it is lower than 176V, it may be considered as brown-out.

The specific control method is as follows. At time t0, the first input power supply 20 starts to be powered on, the first relay S1 is turned on, the common access point of the third relay S3 and the first access point of the third relay S3 are connected, the common access point of the fourth relay S4 and the first access point of the fourth relay S4 are connected, and the PFC and the DCDC start to emit waves.

At time t1, it is detected that the brown-out occurs in the first input power supply 20, and the drive signal of the PFC is turned off first. At time t2, the first relay S1 is turned off, the common access point of the third relay S3 and the second access point of the third relay S3 are connected, the common access point of the fourth relay S4 and the second access point of the fourth relay S4 are connected, and the above operations may either be at the same time or be staggered by a certain period of time.

At time t3, the second relay S2 is turned on.

A length of time between t2 and t3 may be fixed, and the time at which the second relay S2 is turned on may also be determined by monitoring a voltage across the first relay S1 in real time (for example, when it is determined that the first relay S1 is completely turned off by detecting and judging the voltage, the second relay S2 is started to be turned on).

A length of time between t3 and t4 may be fixed, and an appropriate restoring time of the drive signal for the PDF may also be determined by monitoring a voltage across the second relay S2 in real time.

At time t4, after it is judged and determined through the voltage that the automatic transfer switch completes switching, the power factor correction circuit is restored to emit a wave signal.

At time t5, when it is detected that the first input power supply 20 is restored to normal and it is considered that the ATS can switch back to the first input power supply 20 for powering, the drive signal for the PFC is turned off first.

At time t6, the second relay S2 is turned off, the common access point of the third relay S3 and the first access point of the third relay S3 are connected, the common access point of the fourth relay S4 and the first access point of the fourth relay S4 are connected, and the above operations may either be at the same time or be staggered by a certain period of time.

At time t7, the first relay S1 is turned on.

A length of time between t6 and t7 may be fixed, and the time at which the second relay S1 is turned on may also be determined by monitoring a voltage across the first relay S2 in real time (for example, when it is determined that the first relay S2 is completely turned off by detecting and judging the voltage, the second relay S1 is started to be turned on).

A length of time between t7 and t8 may be fixed, and an appropriate restoring time of the drive signal for the PDF may also be determined by monitoring a voltage across the second relay S1 in real time.

At time t8, after it is judged and determined through the voltage that the automatic transfer switch completes switching, the power factor correction circuit is restored to emit a wave signal.

Figure 7:
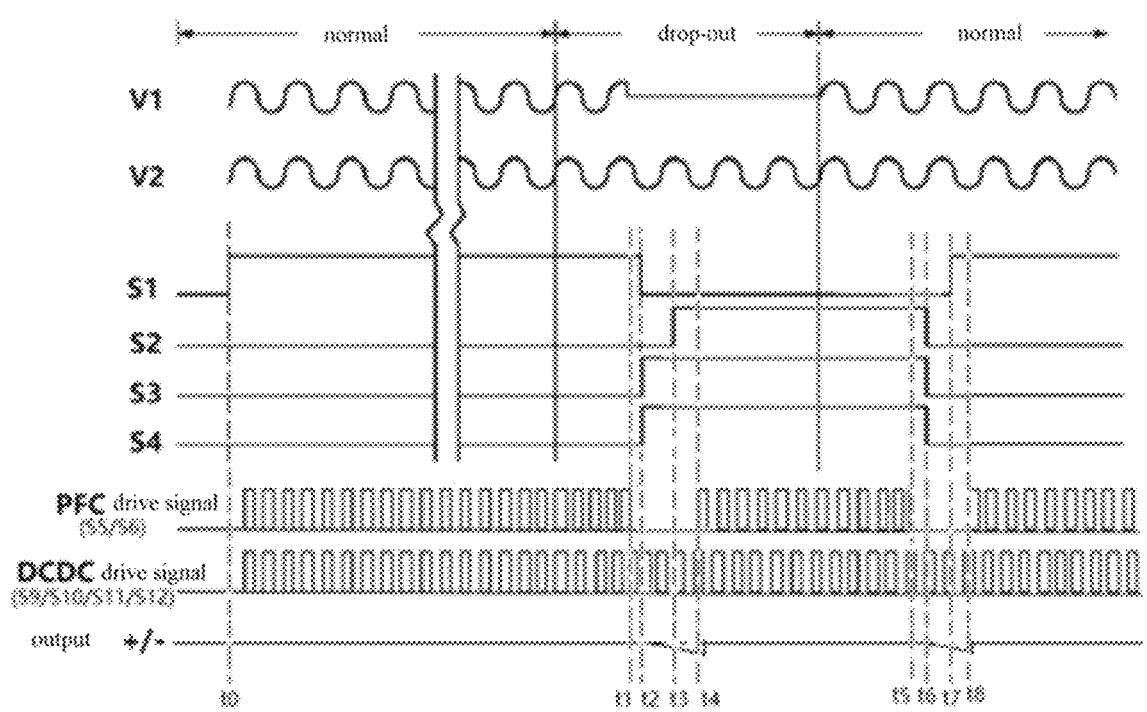
FIG. 7 is a control timing diagram at the time of occurrence of drop-out to an optional first input power supply according to an embodiment of the present disclosure.

FIG. 7 is a control timing diagram at the time of occurrence of drop-out to an optional first input power supply 20 according to an embodiment of the present disclosure, in which a control method is consistent with that in the above embodiment and will no longer be repeatedly described in this embodiment.

It should be noted that, the steps shown in the flowcharts of the accompanying drawings may be performed in a computer system such as a set of computer-executable instructions, and, although a logical order is shown in the flowcharts, in some cases the steps as shown or described may be performed in an order different from the order herein.

An embodiment of the present disclosure further provides a control device for a power supply device. It should be noted that, the control device for the power supply device in the embodiment of the present disclosure can be configured to perform the control method for the power supply device according to the embodiment of the present disclosure. The control device of the power supply device according to the embodiment of the present disclosure is described below.

Figure 8:
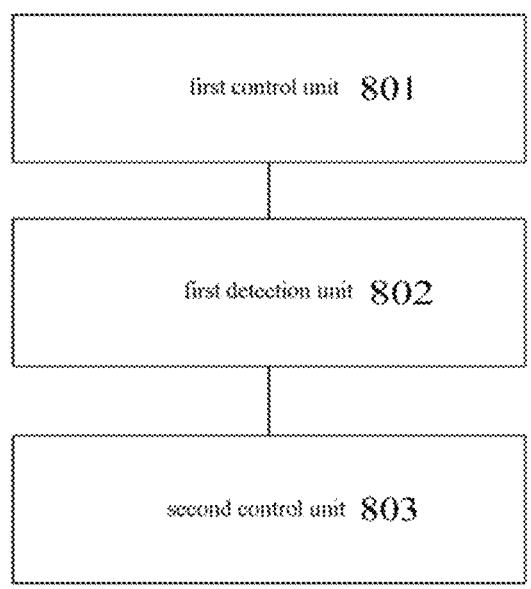
FIG. 8 is a schematic diagram of a control device for a power supply device according to an embodiment of the present disclosure.

FIG. 8 is a schematic diagram of a control device for a power supply device according to an embodiment of the present disclosure. As shown in FIG. 8, the device comprises: a first control unit 801, a first detection unit 802, and a second control unit 803.

The first control unit 801 is configured to control, in a case of powering by the first input power supply, the first access point of the first relay and the third access point of the first relay to be connected, the second access point of the first relay and the fourth access point of the first relay to be connected, the common access point of the third relay and the first access point of the third relay to be connected, and the common access point of the fourth relay and the first access point of the fourth relay to be connected.

The first detection unit 802 is configured to detect whether there is an abnormal situation in the first input power supply, wherein the abnormal situation comprises at least one of: overvoltage, brown-out, and drop-out.

The second control unit 803 is configured to control, when there is the abnormal situation in the first input power supply, the first access point of the first relay and the third access point of the first relay to be disconnected, the second access point of the first relay and the fourth access point of the first relay to be disconnected, the common access point of the third relay and the second access point of the third relay to be connected, the common access point of the fourth relay and the second access point of the fourth relay to be connected, the first access point of the second relay and the third access point of the second relay to be connected, and the second access point of the second relay and the fourth access point of the second relay to be connected.

The control device for the power supply device according to the embodiment of the present disclosure solves the problem in the related technology that the adoption of a dual redundant power supply mode in which two sets of power supply devices need to be provided results in a higher cost by comprises: the first control unit 801 configured to control, in a case of powering by the first input power supply, the first access point of the first relay and the third access point of the first relay to be connected, the second access point of the first relay and the fourth access point of the first relay to be connected, the common access point of the third relay and the first access point of the third relay to be connected, and the common access point of the fourth relay and the first access point of the fourth relay to be connected; the first detection unit 802 configured to detect whether there is an abnormal situation in the first input power supply, wherein the abnormal situation comprises at least one of: overvoltage, brown-out, and drop-out; and the second control unit 803 configured to control, when there is the abnormal situation in the first input power supply, the first access point of the first relay and the third access point of the first relay to be disconnected, the second access point of the first relay and the fourth access point of the first relay to be disconnected, the common access point of the third relay and the second access point of the third relay to be connected, the common access point of the fourth relay and the second access point of the fourth relay to be connected, the first access point of the second relay and the third access point of the second relay to be connected, and the second access point of the second relay and the fourth access point of the second relay to be connected. By turning on or off the relays in the automatic transfer switch, the switching between the two input power supplies is realized, which avoids the adoption of a dual redundant power supply mode, thereby achieving an effect of reducing a cost.

In an embodiment, in the control device for the power supply device according to the embodiment of the present disclosure, the control device further comprises: a third control unit configured to, before controlling the first access point of the first relay and the third access point of the first relay to be disconnected, and the second access point of the first relay and the fourth access point of the first relay to be disconnected, turn off a drive signal for driving the power factor correction circuit to operate; and a second detection unit configured to, after controlling the first access point of the second relay and the third access point of the second relay to be connected, and the second access point of the second relay and the fourth access point of the second relay to be connected, detect whether an input voltage value of the power factor correction circuit matches a voltage value of the second input power supply, and in a case where the input voltage value of the power factor correction circuit matches the voltage value of the second input power supply, restore the drive signal for driving the power factor correction circuit to operate.

In an embodiment, in the control device for the power supply device according to the embodiment of the present disclosure, the control device further comprises: a third detection unit configured to, after controlling the first access point of the second relay and the third access point of the second relay to be connected, and the second access point of the second relay and the fourth access point of the second relay to be connected, detect whether the first input power supply is restored to a normal situation; and a fourth control unit configured to control, when the first input power is restored to the normal situation, the first access point of the second relay and the third access point of the second relay to be disconnected, the second access point of the second relay and the fourth access point of the second relay to be disconnected, the common access point of the third relay and the first access point of the third relay to be connected, the common access point of the fourth relay and the first access point of the fourth relay to be connected, the first access point of the first relay and the third access point of the first relay to be connected, and the second access point of the first relay and the fourth access point of the first relay to be connected.

In an embodiment, in the control device for the power supply device according to the embodiment of the present disclosure, the control device further comprises: a fifth control unit configured to, before controlling the first access point of the second relay and the third access point of the second relay to be disconnected, and the second access point of the second relay and the fourth access point of the second relay to be disconnected, turn off the drive signal for driving the power factor correction circuit to operate; and a fourth detection unit configured to, after controlling the first access point of the first relay and the third access point of the first relay to be connected, and the second access point of the first relay and the fourth access point of the first relay to be connected, detect whether the input voltage value of the power factor correction circuit matches a voltage value of the first input power supply, and in a case where the input voltage value of the power factor correction circuit matches the voltage value of the first input power supply, restore the drive signal for driving the power factor correction circuit to operate.

The control device for the power supply device comprises a processor and a memory. All the first control unit 801, first detection unit 802, and second control unit 803, etc. are stored in the memory as program units. The program units stored in the memory are executed by the processor to perform corresponding functions.

The processor includes a core, by which a corresponding program unit is called from the memory. One or more cores can be arranged, so as to perform the control of the power supply device by adjusting core parameters.

The memory may include forms such as a non-persistent memory, random access memory (RAM), and/or non-volatile memory and the like among computer-readable media, such as a read-only memory (ROM) or flash RAM. The memory includes at least one memory chip.

An embodiment of the present disclosure provides a computer-readable storage medium having stored thereon a program that, when executed by a processor, performs the control method for the power supply device.

An embodiment of the present disclosure provides a processor configured to execute a program, wherein the program, when executed, performs the control method for the power supply device.

An embodiment of the prevent disclosure provides an apparatus, which comprises a processor, a memory, and a program stored on the memory and capable of being executed on the processor. The processor performs the following steps when executing the program: controlling, in a case of powering by the first input power supply, the first access point of the first relay and the third access point of the first relay to be connected, the second access point of the first relay and the fourth access point of the first relay to be connected, the common access point of the third relay and the first access point of the third relay to be connected, and the common access point of the fourth relay and the first access point of the fourth relay to be connected; detecting whether there is an abnormal situation in the first input power supply, wherein the abnormal situation comprises at least one of: overvoltage, brown-out, and drop-out; and controlling, when there is the abnormal situation in the first input power supply, the first access point of the first relay and the third access point of the first relay to be disconnected, the second access point of the first relay and the fourth access point of the first relay to be disconnected, the common access point of the third relay and the second access point of the third relay to be connected, the common access point of the fourth relay and the second access point of the fourth relay to be connected, the first access point of the second relay and the third access point of the second relay to be connected, and the second access point of the second relay and the fourth access point of the second relay to be connected.

In an embodiment, before controlling the first access point of the first relay and the third access point of the first relay to be disconnected, and the second access point of the first relay and the fourth access point of the first relay to be disconnected, the method further comprises: turning off a drive signal for driving the power factor correction circuit to operate; and after controlling the first access point of the second relay and the third access point of the second relay to be connected, and the second access point of the second relay and the fourth access point of the second relay to be connected, the method further comprises: detecting whether an input voltage value of the power factor correction circuit matches a voltage value of the second input power supply, and in a case where the input voltage value of the power factor correction circuit matches the voltage value of the second input power supply, restoring the drive signal for driving the power factor correction circuit to operate.

In an embodiment, after controlling the first access point of the second relay and the third access point of the second relay to be connected, and the second access point of the second relay and the fourth access point of the second relay to be connected, the method further comprises: detecting whether the first input power supply is restored to a normal situation; and controlling, when the first input power is restored to the normal situation, the first access point of the second relay and the third access point of the second relay to be disconnected, the second access point of the second relay and the fourth access point of the second relay to be disconnected, the common access point of the third relay and the first access point of the third relay to be connected, the common access point of the fourth relay and the first access point of the fourth relay to be connected, the first access point of the first relay and the third access point of the first relay to be connected, and the second access point of the first relay and the fourth access point of the first relay to be connected.

In an embodiment, before controlling the first access point of the second relay and the third access point of the second relay to be disconnected, and the second access point of the second relay and the fourth access point of the second relay to be disconnected, the method further comprises: turning off a drive signal for driving the power factor correction circuit to operate; and after controlling the first access point of the first relay and the third access point of the first relay to be connected, and the second access point of the first relay and the fourth access point of the first relay to be connected, the method further comprises: detecting whether an input voltage value of the power factor correction circuit matches a voltage value of the first input power supply, and in a case where the input voltage value of the power factor correction circuit matches the voltage value of the first input power supply, restoring the drive signal for driving the power factor correction circuit to operate. The apparatus herein may be a server, PC, PAD, mobile phone, etc.

The present disclosure further provides a computer program product that, when executed on a data processing apparatus, is adapted to execute a program initialized with the method steps of: controlling, in a case of powering by the first input power supply, the first access point of the first relay and the third access point of the first relay to be connected, the second access point of the first relay and the fourth access point of the first relay to be connected, the common access point of the third relay and the first access point of the third relay to be connected, and the common access point of the fourth relay and the first access point of the fourth relay to be connected; detecting whether there is an abnormal situation in the first input power supply, wherein the abnormal situation comprises at least one of: overvoltage, brown-out, and drop-out; and controlling, when there is the abnormal situation in the first input power supply, the first access point of the first relay and the third access point of the first relay to be disconnected, the second access point of the first relay and the fourth access point of the first relay to be disconnected, the common access point of the third relay and the second access point of the third relay to be connected, the common access point of the fourth relay and the second access point of the fourth relay to be connected, the first access point of the second relay and the third access point of the second relay to be connected, and the second access point of the second relay and the fourth access point of the second relay to be connected.

In an embodiment, before controlling the first access point of the first relay and the third access point of the first relay to be disconnected, and the second access point of the first relay and the fourth access point of the first relay to be disconnected, the method further comprises: turning off a drive signal for driving the power factor correction circuit to operate; and after controlling the first access point of the second relay and the third access point of the second relay to be connected, and the second access point of the second relay and the fourth access point of the second relay to be connected, the method further comprises: detecting whether an input voltage value of the power factor correction circuit matches a voltage value of the second input power supply, and in a case where the input voltage value of the power factor correction circuit matches the voltage value of the second input power supply, restoring the drive signal for driving the power factor correction circuit to operate.

In an embodiment, after controlling the first access point of the second relay and the third access point of the second relay to be connected, and the second access point of the second relay and the fourth access point of the second relay to be connected, the method further comprises: detecting whether the first input power supply is restored to a normal situation; and controlling, when the first input power is restored to the normal situation, the first access point of the second relay and the third access point of the second relay to be disconnected, the second access point of the second relay and the fourth access point of the second relay to be disconnected, the common access point of the third relay and the first access point of the third relay to be connected, the common access point of the fourth relay and the first access point of the fourth relay to be connected, the first access point of the first relay and the third access point of the first relay to be connected, and the second access point of the first relay and the fourth access point of the first relay to be connected.

In an embodiment, before controlling the first access point of the second relay and the third access point of the second relay to be disconnected, and the second access point of the second relay and the fourth access point of the second relay to be disconnected, the method further comprises: turning off a drive signal for driving the power factor correction circuit to operate; and after controlling the first access point of the first relay and the third access point of the first relay to be connected, and the second access point of the first relay and the fourth access point of the first relay to be connected, the method further comprises: detecting whether an input voltage value of the power factor correction circuit matches a voltage value of the first input power supply, and in a case where the input voltage value of the power factor correction circuit matches the voltage value of the first input power supply, restoring the drive signal for driving the power factor correction circuit to operate.

Those skilled in the art should appreciate that embodiments of the present disclosure may be implemented as methods, systems, or computer program products. Accordingly, the present disclosure may take the form of a full hardware embodiment, a full software embodiment, or an embodiment combining software and hardware aspects.

Moreover, the present disclosure may take the form of a computer program product implemented on one or more computer-usable storage media (including, but not limited to, magnetic disc memory, CD-ROM, optical memory, etc.) comprising computer-usable program code therein.

The present disclosure is described with reference to flowcharts and/or block diagrams of methods, apparatus (systems), and computer program products according to embodiments of the present disclosure. It should be understood that each flow and/or block in the flowcharts and/or block diagrams, as well as combinations of flows and/or blocks in the flowcharts and/or block diagrams, may be implemented by computer program instructions. These computer program instructions may be provided to a processor of a general-purpose computer, a special-purpose computer, an embedded processing machine or other programmable data processing apparatus to produce a machine, such that instructions executed by the processor of the computer or the other programmable data processing apparatus produce means for implementing functions specified in one or more flows in the flowcharts and/or one or more blocks in the block diagrams.

These computer program instructions may also be stored in a computer-readable memory capable of guiding a computer or other programmable data processing apparatus to operate in a particular manner, such that instructions stored in the computer-readable memory produce an article of manufacture comprising instruction means, the instruction means implementing functions specified in one or more flows in the flowcharts and/or one or more blocks in the block diagrams.

These computer program instructions may also be loaded onto a computer or other programmable data processing apparatus, such that a series of operation steps are performed on the computer or the other programmable apparatus to produce a computer-implemented process, whereby instructions executed on the computer or the other programmable apparatus provide steps for implementing functions specified in one or more flows in the flowcharts and/or one or more blocks in the block diagrams.

In a typical configuration, a computing apparatus comprises one or more processors (CPUs), an input/output interface, a network interface, and a memory.

The memory may include forms such as a non-persistent memory, random access memory (RAM) and/or non-volatile memory and the like among computer-readable media, such as a read-only memory (ROM) or flash RAM. The memory is an example of the computer-readable media.

The computer-readable media, including persistent, non-permanent, removable and non-removable media, can implement information storage by any method or technology. Information may be computer-readable instructions, data structures, modules of programs, or other data. Examples of storage media of computers include, but are not limited to, a phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disc read-only memory (CD-ROM), digital versatile disc (DVD) or other optical storage, magnetic tape cassette, magnetic tape magnetic disc storage or other magnetic storage devices or any other non-transmission medium which may be used to store information accessible by a computing apparatus. As defined herein, the computer-readable media do not include transitory computer-readable media (transitory media), such as modulated data signals and carrier waves.

It should also be noted that terms "comprise", "include" or any other variant thereof are intended to encompass non-exclusive inclusion, such that a process, method, commodity or apparatus comprising a series of elements not only includes those elements but also includes other elements not expressly listed or inherent to such a process, method, commodity or apparatus. Without more limitations, an element defined by a statement "comprising a . . . " does not preclude further presence of additional identical elements in a process, method, commodity or apparatus that includes the element.

Those skilled in the art should appreciate that embodiments of the present disclosure may be implemented as methods, systems, or computer program products. Accordingly, the present disclosure may take the form of a full hardware embodiment, a full software embodiment, or an embodiment combining software and hardware aspects. Moreover, the present disclosure may take the form of a computer program product implemented on one or more computer-usable storage media (including, but not limited to, magnetic disc memory, CD-ROM, optical memory, etc.) comprising computer-usable program code therein.

The above is only embodiments of the present disclosure, but is not used to limit the present disclosure. For those skilled in the art, the present disclosure may have various modifications and variations. Any modification, equivalent substitution, improvement and the like made within the spirit and principle of the present disclosure shall be included within the scope of the claims of the present disclosure.

The invention claimed is:

1. A control method for a power supply device, characterized in that the power supply device comprises:
   an automatic transfer switch comprising an input terminal connected to an output terminal of a first input power supply and an output terminal of a second input power supply, and configured to connect the first input power supply or the second input power supply to a power factor correction circuit;
   the power factor correction circuit comprising an input terminal connected to an output terminal of the automatic transfer switch, and configured to adjust an input power factor of a load, wherein the load is powered by the first input power supply or the second input power supply; and
   a DC-DC converter comprising an input terminal connected to an output terminal of the power factor correction circuit and an output terminal connected to the load, and configured to convert an output voltage of the power factor correction circuit to an input voltage of the load,
   the automatic transfer switch comprises: a first relay, a second relay, a third relay, and a fourth relay,
   wherein the first relay and the second relay are double-pole double-throw switches, and the third relay and the fourth relay are single-pole double-throw switches;
   wherein a first access point of the first relay is connected to a positive output terminal of the first input power supply, a second access point of the first relay is connected to a negative output terminal of the first input power supply, a third access point of the first relay is connected to a first access point of the third relay, a fourth access point of the first relay is connected to a first access point of the fourth relay, a common access point of the third relay is connected to a positive input terminal of the power factor correction circuit, and a common access point of the fourth relay is connected to a negative input terminal of the power factor correction circuit; and wherein a first access point of the second relay is connected to a positive output terminal of the second input power supply, a second access point of the second relay is connected to a negative output terminal of the second input power supply, a third access point of the second relay is connected to a second access point of the third relay, and a fourth access point of the second relay is connected to a second access point of the fourth relay, the method comprises:

controlling, in a case of powering by the first input power supply, the first access point of the first relay and the third access point of the first relay to be connected, the second access point of the first relay and the fourth access point of the first relay to be connected, the common access point of the third relay and the first access point of the third relay to be connected, and the common access point of the fourth relay and the first access point of the fourth relay to be connected;

detecting whether there is an abnormal situation in the first input power supply, wherein the abnormal situation comprises at least one of: overvoltage, brown-out, and drop-out; and controlling, when there is the abnormal situation in the first input power supply, the first access point of the first relay and the third access point of the first relay to be disconnected, the second access point of the first relay and the fourth access point of the first relay to be disconnected, the common access point of the third relay and the second access point of the third relay to be connected, the common access point of the fourth relay and the second access point of the fourth relay to be connected, the first access point of the second relay and the third access point of the second relay to be connected, and the second access point of the second relay and the fourth access point of the second relay to be connected, the method further comprises:

before controlling the first access point of the first relay and the third access point of the first relay to be disconnected, and the second access point of the first relay and the fourth access point of the first relay to be disconnected, turning off a drive signal for driving the power factor correction circuit to operate; and after controlling the first access point of the second relay and the third access point of the second relay to be connected, and the second access point of the second relay and the fourth access point of the second relay to be connected, detecting whether an input voltage value of the power factor correction circuit matches a voltage value of the second input power supply, and in a case where the input voltage value of the power factor correction circuit matches the voltage value of the second input power supply, restoring the drive signal for driving the power factor correction circuit to operate.

2. The control method according to claim 1, characterized in that the method further comprises:

after controlling the first access point of the second relay and the third access point of the second relay to be connected, and the second access point of the second relay and the fourth access point of the second relay to be connected, detecting whether the first input power supply is restored to a normal situation; and controlling, when the first input power is restored to the normal situation, the first access point of the second relay and the third access point of the second relay to be disconnected, the second access point of the second relay and the fourth access point of the second relay to be disconnected, the common access point of the third relay and the first access point of the third relay to be connected, the common access point of the fourth relay and the first access point of the fourth relay to be connected, the first access point of the first relay and the third access point of the first relay to be connected, and the second access point of the first relay and the fourth access point of the first relay to be connected.

3. The control method according to claim 2, characterized in that the method further comprises:

before controlling the first access point of the second relay and the third access point of the second relay to be disconnected, and the second access point of the second relay and the fourth access point of the second relay to be disconnected, turning off the drive signal for driving the power factor correction circuit to operate; and after controlling the first access point of the first relay and the third access point of the first relay to be connected, and the second access point of the first relay and the fourth access point of the first relay to be connected, detecting whether the input voltage value of the power factor correction circuit matches a voltage value of the first input power supply, and in a case where the input voltage value of the power factor correction circuit matches the voltage value of the first input power supply, restoring the drive signal for driving the power factor correction circuit to operate.

4. A control device for a power supply device, characterized in that:

the power supply device comprises:

an automatic transfer switch comprising an input terminal connected to an output terminal of a first input power supply and an output terminal of a second input power supply, and configured to connect the first input power supply or the second input power supply to a power factor correction circuit;

the power factor correction circuit comprising an input terminal connected to an output terminal of the automatic transfer switch, and configured to adjust an input power factor of a load, wherein the load is powered by the first input power supply or the second input power supply; and a DC-DC converter comprising an input terminal connected to an output terminal of the power factor correction circuit and an output terminal connected to the load, and configured to convert an output voltage of the power factor correction circuit to an input voltage of the load, the automatic transfer switch comprises: a first relay, a second relay, a third relay, and a fourth relay, wherein the first relay and the second relay are double-pole double-throw switches, and the third relay and the fourth relay are single-pole double-throw switches;

wherein a first access point of the first relay is connected to a positive output terminal of the first input power supply, a second access point of the first relay is connected to a negative output terminal of the first input power supply, a third access point of the first relay is connected to a first access point of the third relay, a fourth access point of the first relay is connected to a first access point of the fourth relay, a common access point of the third relay is connected to a positive input terminal of the power factor correction circuit, and a common access point of the fourth relay is connected to a negative input terminal of the power factor correction circuit; and wherein a first access point of the second relay is connected to a positive output terminal of the second input power supply, a second access point of the second relay is connected to a negative output terminal of the second input power supply, a third access point of the second relay is connected to a second access point of the third relay, and a fourth access point of the second relay is connected to a second access point of the fourth relay, the control device comprises:
- a first control unit configured to control, in a case of powering by the first input power supply, the first access point of the first relay and the third access point of the first relay to be connected, the second access point of the first relay and the fourth access point of the first relay to be connected, the common access point of the third relay and the first access point of the third relay to be connected, and the common access point of the fourth relay and the first access point of the fourth relay to be connected;
- a first detection unit configured to detect whether there is an abnormal situation in the first input power supply, wherein the abnormal situation comprises at least one of: overvoltage, brown-out, and drop-out; and
- a second control unit configured to control, when there is the abnormal situation in the first input power supply, the first access point of the first relay and the third access point of the first relay to be disconnected, the second access point of the first relay and the fourth access point of the first relay to be disconnected, the common access point of the third relay and the second access point of the third relay to be connected, the common access point of the fourth relay and the second access point of the fourth relay to be connected, the first access point of the second relay and the third access point of the second relay to be connected, and the second access point of the second relay and the fourth access point of the second relay to be connected, the control device further comprises:
- a third control unit configured to, before controlling the first access point of the first relay and the third access point of the first relay to be disconnected, and the second access point of the first relay and the fourth access point of the first relay to be disconnected, turn off a drive signal for driving the power factor correction circuit to operate; and
- a second detection unit configured to, after controlling the first access point of the second relay and the third access point of the second relay to be connected, and the second access point of the second relay and the fourth access point of the second relay to be connected, detect whether an input voltage value of the power factor correction circuit matches a voltage value of the second input power supply, and in a case where the input voltage value of the power factor correction circuit matches the voltage value of the second input power supply, restore the drive signal for driving the power factor correction circuit to operate.

5. A computer-readable storage medium, characterized in that the storage medium stores a program, wherein the program performs the control method for the power supply device according to claim 1.

6. A processor, characterized in that the processor is configured to execute a program, wherein the program, when executed, performs the control method for the power supply device according to claim 5.

7. The control method according to claim 1, characterized in that the power factor correction circuit is at least one of: a totem-pole power factor correction circuit, a bridge power factor correction circuit, and a bridgeless power factor correction circuit.

8. The control method according to claim 1, characterized in that the DC-DC converter is at least one of: an LLC resonant full-bridge circuit, an LLC resonant half-bridge circuit, and a phase-shifted full-bridge topology circuit.

9. The control device according to claim 4, characterized in that the control device further comprises:
- a third detection unit configured to, after controlling the first access point of the second relay and the third access point of the second relay to be connected, and the second access point of the second relay and the fourth access point of the second relay to be connected, detect whether the first input power supply is restored to a normal situation; and
- a fourth control unit configured to control, when the first input power is restored to the normal situation, the first access point of the second relay and the third access point of the second relay to be disconnected, the second access point of the second relay and the fourth access point of the second relay to be disconnected, the common access point of the third relay and the first access point of the third relay to be connected, the common access point of the fourth relay and the first access point of the fourth relay to be connected, the first access point of the first relay and the third access point of the first relay to be connected, and the second access point of the first relay and the fourth access point of the first relay to be connected.

10. The control device according to claim 9, characterized in that the control device further comprises:
- a fifth control unit configured to, before controlling the first access point of the second relay and the third access point of the second relay to be disconnected, and the second access point of the second relay and the fourth access point of the second relay to be disconnected, turn off the drive signal for driving the power factor correction circuit to operate; and
- a fourth detection unit configured to, after controlling the first access point of the first relay and the third access point of the first relay to be connected, and the second access point of the first relay and the fourth access point of the first relay to be connected, detect whether the input voltage value of the power factor correction circuit matches a voltage value of the first input power supply, and in a case where the input voltage value of the power factor correction circuit matches the voltage value of the first input power supply, restore the drive signal for driving the power factor correction circuit to operate.

11. The control device according to claim 4, characterized in that the power factor correction circuit is at least one of: a totem-pole power factor correction circuit, a bridge power factor correction circuit, and a bridgeless power factor correction circuit.

12. The control device according to claim 4, characterized in that the DC-DC converter is at least one of: an LLC resonant full-bridge circuit, an LLC resonant half-bridge circuit, and a phase-shifted full-bridge topology circuit.

* * * * *